No. 625,003. Patented May 16, 1899.
J. H. WHITING.
DEVICE FOR TRANSMITTING MOTION.
(Application filed June 16, 1897.)

(No Model.)

Witnesses:
L. C. Hills
Maude Dexter

Inventor:
J. H. Whiting
By Glancock &c.
Attys.

UNITED STATES PATENT OFFICE.

JOHN H. WHITING, OF BELVIDERE, ILLINOIS.

DEVICE FOR TRANSMITTING MOTION.

SPECIFICATION forming part of Letters Patent No. 625,003, dated May 16, 1899.

Application filed June 16, 1897. Serial No. 641,022. (No model.)

*To all whom it may concern:*

Be it known that I, JOHN H. WHITING, a citizen of the United States, residing at Belvidere, in the county of Boone and State of Illinois, have invented a certain new, useful, and valuable Improvement in Devices for Transmitting Motion, of which the following is a full, clear, and exact description.

My invention relates to certain new and useful improvements in devices for transmitting rotary motion, and has for its object to produce a machine having a shaft adapted to receive rotary motion and transmit same to the other shafts carrying gear-wheels adapted to operate a series of sleeves journaled one upon another and surrounding said shaft, the said sleeves carrying pulleys or other rotatable parts.

With these and other objects in view my invention further consists in the novel details of construction and combination of parts to be fully described in the following specification and clearly set forth in the claim.

Figure 1:
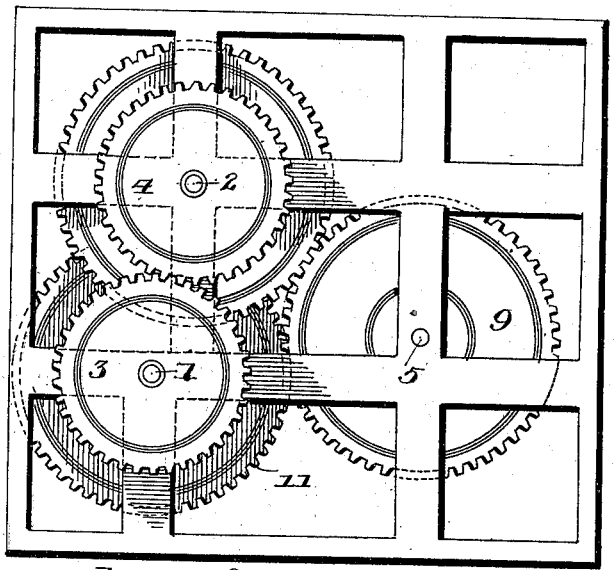
Figure 2:
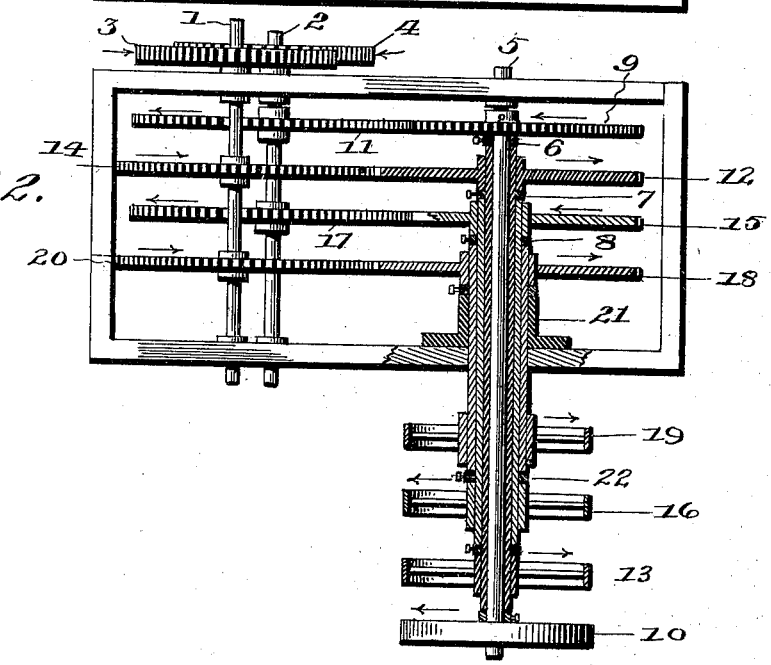

Referring to the accompanying drawings, forming a part of this specification, in which like characters of reference indicate similar parts throughout, Figure 1 is a side elevation of my invention; and Fig. 2 is a bottom plan view thereof, partly in section.

In the drawings, 1 and 2 represent horizontal shafts suitably journaled in a frame A and connected together by means of the intermeshing gear-wheels 3 and 4, secured on the ends thereof. A horizontal main shaft 5 is journaled at one end to the frame and has rotatably mounted thereon a nest or series of independently-movable sleeves 6, 7, and 8, which are journaled in the bearing 21 on the opposite side of the frame A. Gear-wheels 9, 12, 15, and 18 are secured to the inner ends of the shaft 5 and the sleeves 6, 7, and 8, respectively, and mesh with gear-wheels 11, 14, 17, and 20, respectively, the gear-wheels 14 and 20 being mounted on the shaft 1 and the gear-wheels 11 and 17 being mounted on the shaft 2. Pulleys or other suitable rotatable parts 19, 16, 13, and 10 are secured to the outer ends of the sleeves 8, 7, and 6 and the shaft 5, respectively, and each sleeve abuts at each end to a bushing-ring 22, mounted on the part to which that sleeve is journaled.

From the foregoing it will be seen that when power is applied to the pulley 10 the shaft 5 is revolved and by means of the gear-wheels 9 and 11 sets in motion the shaft 2 with its gear-wheel 17, which in turn revolves the sleeve 7 through the gear-wheel 15 to turn the pulley 16 in the same direction as the pulley 10. The shaft 2 turns the shaft 1 through the gear-wheels 4 and 3 in the opposite direction to its own movement, and said shaft 1, by means of the gear-wheels 14 and 20, meshing with gear-wheels 12 and 18, respectively, turns the sleeves 6 and 8, with the pulleys 19 and 13, in the opposite direction to the pulleys 10 and 16. Thus each of the pulleys moves in an opposite direction.

Having described my invention, what I claim as new, and desire to secure by Letters Patent, is—

A frame, a main shaft journaled therein at one end, a nest of sleeves journaled around the main shaft at its middle part, a bearing in the frame through which the outmost sleeve is journaled, gear-wheels secured on the ends of the sleeves and the main shaft within the frame, pulleys mounted on the other ends of said sleeves and main shaft, two secondary shafts journaled in the frame and having gear-wheels meshing with each other, gear-wheels on one of said secondary shafts meshing with the gear-wheels of each alternate sleeve, and gear-wheels on the other secondary shaft meshing with the gear-wheels of the intermediate sleeves and the gear-wheels of the main shaft, substantially as described.

In testimony whereof I affix my signature in presence of two witnesses.

JOHN H. WHITING.

Witnesses:
W. CRAIG,
F. J. BRANNAN.